US005117264A

United States Patent [19]

Frankel et al.

[11] Patent Number: 5,117,264

[45] Date of Patent: May 26, 1992

[54] DAMAGE RESISTANT CLEANING BLADE

[75] Inventors: Neil A. Frankel, Rochester; Nero R. Lindblad, Ontario; Herbert C. Relyea, Webster; Robert J. Meyer, Penfield, all of N.Y.

[73] Assignee: Xerox Corporation, Stamford, Conn.

[21] Appl. No.: 680,191

[22] Filed: Apr. 3, 1991

[51] Int. Cl.[5] .......................... G03G 21/00; B32B 5/16

[52] U.S. Cl. ................................. 355/299; 15/256.51; 428/323; 430/125

[58] Field of Search ............... 355/299, 296; 15/256.5, 15/256.51; 430/125; 428/323, 372

[56] References Cited

U.S. PATENT DOCUMENTS

| | | | |
|---|---|---|---|
| 4,233,387 | 11/1980 | Mammino et al. | 430/137 |
| 4,241,691 | 12/1980 | Hopfe et al. | 15/256.51 |
| 4,298,672 | 11/1981 | Lu | 430/108 |
| 4,370,390 | 1/1983 | Burk | 428/614 |
| 4,549,933 | 10/1985 | Judd et al. | 15/256.51 |
| 4,770,929 | 9/1988 | Nobumasa et al. | 428/284 |
| 4,778,716 | 10/1988 | Thorfinnson et al. | 428/236 |
| 4,823,161 | 4/1989 | Yamada et al. | 355/299 |
| 4,825,249 | 4/1989 | Oki et al. | 355/299 |
| 4,937,633 | 6/1990 | Ewing | 355/299 |
| 4,971,882 | 11/1990 | Jugle | 430/110 |
| 4,978,999 | 12/1990 | Frankel et al. | 355/299 |

OTHER PUBLICATIONS

"A Variational Approach to the Theory of the Elastic Behaviour of Multiphase Materials", by Z. Hashin and S. Shtrikman.

*Primary Examiner*—A. T. Grimley
*Assistant Examiner*—Nestor R. Ramirez

[57] ABSTRACT

A cleaning blade which is made from a material having a fibrous material randomly oriented throughout the material to prevent defect propagation. The cleaning blade is used in an electrophotographic printing device to remove residual particles from a photoconductive surface.

11 Claims, 1 Drawing Sheet

DAMAGE RESISTANT CLEANING BLADE

BACKGROUND OF THE INVENTION

The invention relates generally to electrophotographic printing, and more particularly, a cleaning blade used therein to remove particles adhering to the photoconductive member.

In the process of electrophotographic printing, a photoconductive surface is charged to a substantially uniform potential. The photoconductive surface is imagewise exposed to record an electrostatic latent image corresponding to the informational areas of an original document being reproduced. This records an electrostatic latent image on the photoconductive surface corresponding to the informational areas contained within the original document. Thereafter, a developer material is transported into contact with the electrostatic latent image. Toner particles are attacted from the carrier granules of the developer material onto the latent image. The resultant toner powder image is then transferred from the photoconductive surface to a sheet of support material and permanently affixed thereto.

This process is well known and useful for light lens copying from an original and printing applications from electronically generated or stored originals, and in ionography.

In a reproduction process of the type as described above, it is inevitable that some residual toner will remain on the photoconductive surface after the toner image has been transferred to the sheet of support material (e.g. paper). It has been found that with such a process that the forces holding some of the toner particles to the imaging surface are stronger than the transfer forces and, therefore, some of the particles remain on the surface after transfer of the toner image. In addition to the residual toner, other particles, such as paper debris (i.e. Kaolin, fibers, clay), additives and plastic, are left behind on the surface after image transfer. (Hereinafter, the term "residual particles" encompasses residual toner and other residual particles remaining after image transfer.) The residual particles adhere firmly to the surface and must be removed prior to the next printing cycle to avoid its interfering with recording a new latent image thereon.

Various methods and apparatus may be used for removing residual particles from the photoconductive imaging surface. Hereinbefore, a cleaning brush, a cleaning web, and a cleaning blade have been used. Both cleaning brushes and cleaning webs operate by wiping the surface so as to affect transfer of the residual particles from the imaging surface thereon. After prolonged usage, however, both of these types of cleaning devices become contaminated with toner and must be replaced. This requires discarding the dirty cleaning devices. In high-speed machines this practice has proven not only to be wasteful but also expensive.

The shortcomings of the brush and web made way for another now prevalent form of cleaning known and disclosed in the art—blade cleaning. Blade cleaning involves a blade, normally made of a rubberlike material (e.g. polyurethane) which is dragged or wiped across the surface to remove the residual particles from the surface. Blade cleaning is a highly desirable method, compared to other methods, for removing residual particles due to its simple, inexpensive structure. However, there are certain deficiencies in blade cleaning, which are primarily a result of the frictional sealing contact that must occur between the blade and the surface.

Dynamic friction is the force that resists relative motion between two bodies that come into contact with each other while having separate motion. This friction between the blade edge and the surface causes wearing away of the blade edge, and damages the blade's contact with the surface. For purposes of this application, volume wear (W) is proportional to the load (F) multiplied by the distance (D) traveled. Thus, $W \propto FD \propto FVT$, or introducing a factor of proportionality K, $W=KFVT$ where K is the wear factor, V is the velocity and T is the elapsed time. Hence, wear increases with larger values of K. Various blade lubricating materials or toner lubricant additives have been proposed to reduce friction which would thereby reduce wear. However, lubricants tend to change the operational characteristics of the printing machine undesirably. For example, a polyurethane blade with a good lubricant in the toner can ideally achieve a frictional coefficient of about 0.5, however, this rarely occurs because of the delicate balance involved in achieving the proper weight percent of lubricant in the toner. (Normal frictional coefficient values for cleaning blades removing toner off of the imaging surface ranges from a low of about 0.5 to a high of about 1.5).

In addition to the problem of wear, blades are also subject to unpredictable failures. In normal operational configuration, with a coefficient of dynamic friction in the range of about 0.5 to about 1.5, a blade cleaning edge or tip in sealing contact with the surface is deformed or tucked slightly. The blade is not in intimate contact with the surface, but slides on toner particles and lubricant to maintain the sealing contact required for cleaning. In this configuration, the blade may flatten particles that pass under the blade and cause impaction of particles on the surface. This process is called cometing because of the comet-like impressions created by the flattened particles. The impact from carrier beads remaining on the surface subsequent to development may damage the blade. Sudden localized increases in friction between the blade and surface may cause the phenomenon of tucking, where the blade cleaning edge becomes folded underneath the blade, losing the frictional sealing relationship required for blade cleaning.

Cleaning blades will eventually wear out due to the effects of abrasion against the surface being cleaned. However, it has been observed that many blades fail well before abrasion has caused appreciable wear of the blade edge. The observed failure rates for cleaning blades in electrostatographic machines show that an appreciable percentage of the failures occur at random intervals. It has also been observed that small damaged areas on the blade edge can grow in size over time, often leading to leakage of toner past the blade in the form of a streak, leading to cleaning failure. The present invention reduces blade failuresassociated with randomly occurring defects to the blade edge.

Blade damage can be caused by collision with developer beads, or by edge defects that can originate in cutting during blade manufacture, or as a result of attempts to clean the blade by wiping it laterally along the edge, thereby producing small tears in the edge. When the damage area is of the order of ten times the diameter of the toner in size, an active leak of toner through the cleaning blade will occur, causing a cleaning failure. Since developer beads are typically about ten times the size of toners, this scale of blade damage can occur frequently due to collisions with free developer beads. Also, it is well known that small defects can propagate, or zip open, in resilient materials such as those used for cleaning blades. These small defects are produced in the cutting operation, or in attempts to clean the blade, or may even result from inhomogeneities in the bulk material prior to cutting. A large number of blades must be replaced as a result of defect propagation, thus it is an object of this invention to eliminate this defect propagation.

The following disclosures may be relevant to various aspects of the present invention and may be briefly summarized as follows:

U.S. Pat. No. 4,770,929 to Nobumasa et al. describes a light weight composite material having a laminated structure comprising 1) a porous fiber layer constructed of reinforcing short fibers which are randomly distributed, 2) a fiber reinforced plastic layer, and 3) a matrix resin.

U.S. Pat. No. 4,778,716 to Thorfinnson et al. describes microfibers which are used to prepare composites having improved impact resistance without a loss in strength and modulus.

U.S. Pat. No. 4,823,161 to Yamada et al. describes a cleaning blade comprising a double-layer structure and a contact member made of a poly(urethane)ureamide polymer held in contact with a toner image bearing member.

U.S. Pat. No. 4,825,249 to Oki et al. describes a sharp, resilient cleaning blade for a photoelectronic copy machine comprising a substrate of urethane rubber coated with perfluoropolyether.

U.S. Pat. No. 4,978,999 to Frankel et al. describes a cleaning blade that incorporates fiber fillers that are oriented in a single direction in an elastomeric matrix.

SUMMARY OF INVENTION

Briefly stated, and in accordance with the present invention, there is provided a cleaning blade in frictional engagement with a surface and being adapted to remove particles therefrom. The cleaning blade has a blade body where one end defines a free edge and that blade body includes a multiplicity of randomly oriented fibers. Means for supporting the blade body presses the free edge against the surface.

BRIEF DESCRIPTION OF THE DRAWINGS

Other objects and advantages of the present invention will become apparent upon reading the following detailed description and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
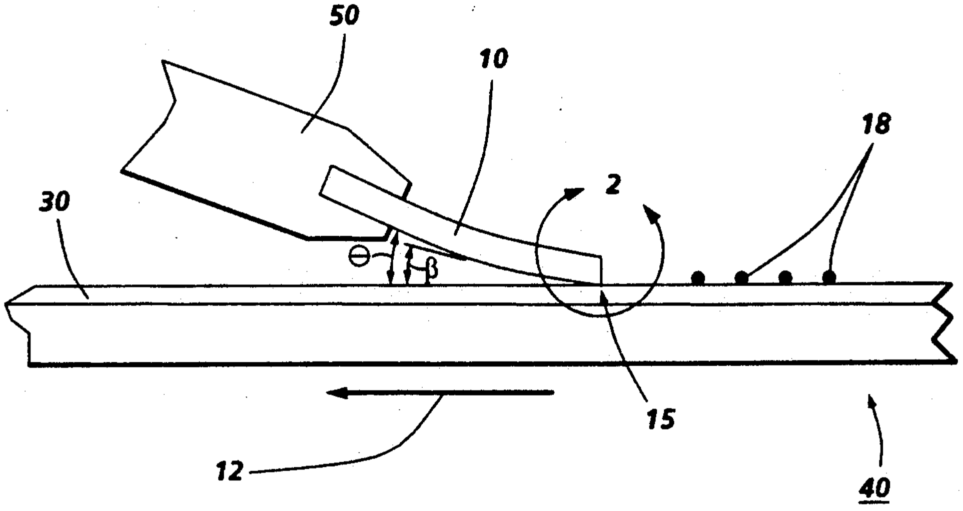
FIG. 1 shows a schematic elevational view depicting one exemplary cleaning blade, incorporating the features of the present invention therein.
Figure 2:
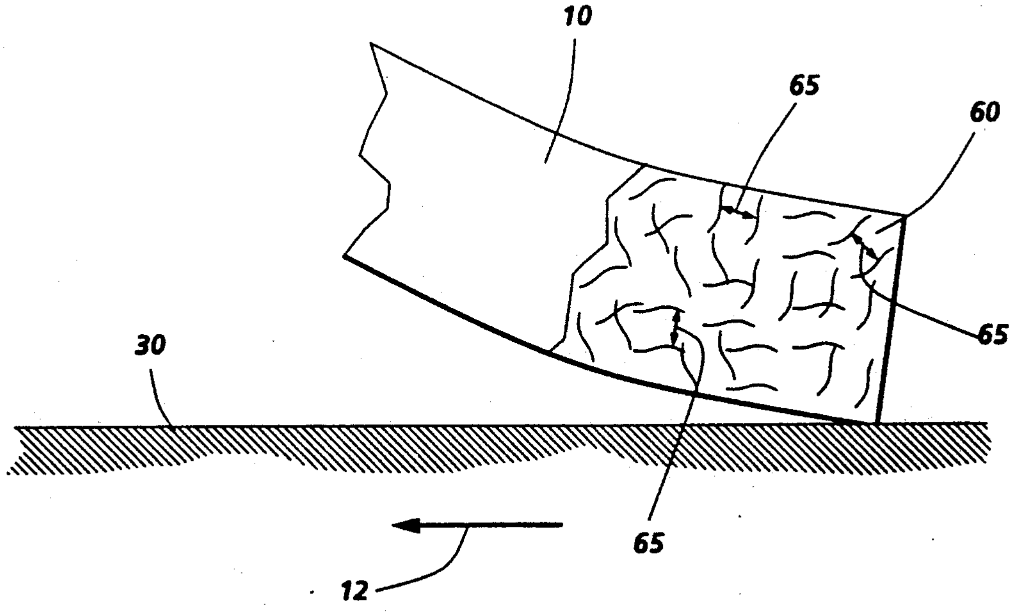
FIG. 2 is an enlarged, partial sectional view of the area designated as 2 in the FIG. 1 cleaning blade.

With reference now to the drawings where the showings are for the purpose of illustrating a preferred embodiment of the invention and not for limiting same, FIG. 1 shows a schematic view of an elastomeric cleaning blade, and FIG. 2 shows a sectional view of the cleaning blade, in accordance with the invention, where the fibers are randomly oriented through an elastomeric matrix. Hereinafter, like reference numerals will be employed throughout to designate identical elements. Although the cleaning apparatus of the present invention is particularly well adapted for use in an electrophotographic printing machine, it should become evident from the following discussion that it is equally well suited for use in a wide variety of devices and is not necessarily limited to the particular embodiments shown herein.

Referring now to FIG. 1 which shows a cleaning blade 10 in a cleaning relationship with a photoconductive surface 30 of belt 40. A blade holder 50 is provided to support blade 10 in frictional sealingcontact with surface 30. Cleaning blade edge 15 is located where blade 10 and imaging surface 30 meet to form a sealing contact. In the doctoring mode that is depicted in FIG. 1, the cleaning blade edge 15 acts as a scraper in removing the residual particles 18 from the imaging surface 30. The cleaning blade edge 15 is in frictional contact with the imaging surface 30 as the imaging surface 30 moves in the direction 12 indicated.

The blade holder angle $\theta$ typically ranges from about 10° to about 25°. In the case of the cleaning blade 10 in the wiping mode, $\theta$ would typically range from 90° to 110° in FIG. 1. The working angle $\beta$ of the elastomeric blade 10 ranges from about 5° to about 15°. Typically the free length of blade 10 extending from blade holder 50 is about 0.4 inches.

Referring now to the specific subject matter of the present invention, FIG. 2 depicts a partial sectional view of the cleaning blade 10 with filler fiber 60. Cleaning blade 10 is made from an elastomeric material. The spacing 65 of the filler fiber 60 throughout the elastomeric material is no more than 10 times a toner particle diameter or a carrier bead diameter $D_c$, whichever is smaller, distance away from another filler fiber 60. These filler fibers 60 are short, high aspect ratio (i.e. a ratio of one dimension to another such as length to width) and high tensile strength fibers 60 randomly oriented throughout the elastomeric material. Satisfactory fillers fiber 60 materials include glass, carbon, graphite, mineral, nylon polyesters, polyurethane terephthalate, boron, silicon carbide, aramid, ceramic and metal fibers.

There are a variety of methods to fabricate randomly oriented fibers throughout the matrix of the elastomeric material. One method involves adding the fibers to the polymer (e.g. polyurethane) or the prepolymer (e.g. polyesters and polyethers) of the blade material. Care has been taken to avoid extremely high shear which may break up the fibers and reduce their aspect ratio below the desired value. The filler fibers are added to the liquid prepolymer or polymer and then put through a conventional three roll mill apparatus which is used to break up the agglomeration of fibers in the prepolymer. Then, the solution is spin-cast in order to create a sheet of blade material that is then cut into cleaning blades.

Another common method of blade fabrication is what is known in the art as "draw down". A bar is used to flatten out the elastomeric material or prepolymer into a film. Fibers are then sprinkled on top of this "drawn down" film. These are two common methods of cleaning blade fabrication but are not to be viewed as limiting.

In order for the fibers to adhere to the prepolymer the proper affinity must exist between them. Some fiber materials may require the addition of primers (e.g. silane and titanates) to provide the fibers with the proper affinity to the elastomeric material.

An approach to prevent damaged areas on the blade edge from reaching the critical dimension defined as either ten times the toner diameter ($10\times D_t$) or as the carrier bead diameter $D_c$, whichever is smaller, is to distribute randomly oriented, short, high aspect ratio fibers throughout the bulk material that makes up the blade. The average volume toner particle size ranges from 5 to 15 microns. The average volume carrier bead particle size ranges from as low as that of the toner particle size used, to as high as 200 microns. Representative patents in which particle size are disclosed include U.S. Pat. No. 4,298,672, U.S. Pat. No. 4,233,387 and U.S. Pat. No. 4,971,882. The average spacing of these randomly oriented, short, high aspect ratio fibers throughout the bulk material should be less than the critical dimension. Also, the fibers should have relatively high tensile strength (e.g. $>50,000$ psi) and good surface adhesion (e.g. surface energy $>30$ dynes/cm) to the bulk material. In this case, small defects in the blade will be constrained from "opening up" beyond the critical dimension due to the presence of the fibers. The fibers, in effect, will act as reinforcing network which prevents defects from forming above the critical dimension.

In order to maintain resilience and the preferred elastic properties for good cleaning, the modulus of the elastomeric material of the cleaning blade should not be increased by more than 5% by the addition of fibers. Generally, this means that only a few % by volume of added fibers will be tolerable. The maximum volume fraction of fibers can be estimated from the theory of Hashin and Shtrikman. (Z. Hashin and S. Shtrikman, "A Variational Approach to the Theory of Elastic Behavior of Multiphase Materials," J. Mech. Phys. Solids, Vol. 11, 126-140 (1963). A copy is enclosed). However, the amount of added fibers necessary to achieve the desired improvement in resistance to abrasion and tear may be less than the maximum amount allowed by the above theory.

For example, if the fibers are of diameter $D_f$, and of length L, and the toner is of diameter $D_t$, then the desired fibers per unit volume can be calculated as follows:

$$\text{fibers/unit volume} = 1/(10\times D_t)^3$$

For the special case of $D_t = 10$ microns, then, $$\text{fibers/unit volume} = 10^6\ \text{fibers/cm}^3$$

Also, the volume fraction of fibers in the bulk material is then:

$$\begin{aligned}\text{Volume fraction fibers} &= (\text{fibers/unit volume}) \times (\text{fiber volume})\\ &= \Pi \times L \times (D_f)^2/[4000 \times (D_t)^3]\end{aligned}$$

For the special case of $D_f = D_t$, $L = 10 \times D_f$, then:

$$\text{Volume fraction fibers} = \Pi/400 = 0.0079$$

This example illustrates that a very low volume fraction of fibers would be sufficient to constrain the size of the defects to be less than 100 microns. At this low volume fraction, the cleaning blade will retain its resilient characteristics which are preferred for good cleaning.

The aspect ratio of the added fibers should be high, as previously noted, in order to spread the localized tearing stresses over sufficiently large areas in order to prevent tearing and abrasive wear. The minimum aspect ratios and tensile strength of fibers to accomplish the above function can be estimated from considerations of the forces on the fibers, and adhesive bonding between the fibers and the matrix material.

Cleaning blades are made of resilient materials, such as urethanes, which maintain their resilience and elasticity over a wide range of operating temperatures. These characteristics enable the blades to conform closely to the surface being cleaned. It is important that any fibers added to the blade material in order to improve its resistance to tearing and abrading, should not degrade the properties responsible for good cleaning, such as resilience. In practice, this means that the concentration of added fibers needs to be relatively low, and that the fibers should be relatively flexible. In order for the fibers to be flexible, they should have a sufficiently small diameter $D_f$ and/or a sufficiently low value of modulus $E_f$, (i.e. young's modulus) such that the product of the modulus and the fourth power of the fiber diameter is relatively small compared with the square of the fiber length L; i.e., the expression $$[(E_f)\times(D_f)^4]/L^2 \qquad [1]$$

is relatively small compared with the forces on the fiber tending to deform it. On the other hand, the tensile strength $T_f$ of the fiber needs to be relatively large to avoid breakage, so that the expression $$(T_f)\times(D_f)^2 \qquad [2]$$

should be relatively large compared with the forces on the fiber tending to stretch it. These forces may be created by adjacent sections of blade material that are in the process of tearing open or abrading away. Thus, it is the tensile strength of the fibers that prevents the blade defects from growing beyond a limited size.

Since the fibers are randomly oriented, the deforming forces should be of the same order as the stretching forces, and thus we have the following desired property of the added fibers:

$$L/D_f >> (E_f/T_f)^{\frac{1}{2}} \qquad [3]$$

Typical values of $E_f/T_f$ for representative fiber materials are:

| Fiber | $E_f/T_f$ |
|---|---|
| Nylon | 6 |
| Fiberglass | 20 |
| Kevlar | 50 |
| Steel | 100 |
| Boron Filament | 120 |
| Graphite Filament | 140 |

Therefore, the aspect ratios of the fibers should generally exceed 2 to 12 in order for the above inequality to be satisfied. Preferably, the aspect ratio should be an order of magnitude greater than these estimates.

Additionally, the tensile strength of the fibers should exceed the tensile strength of the matrix material in order to prevent tearing and abrading of the composite. Typical values of tensile strength of polyurethane, for example, are in the range 1000 to 5000 psi. Many representative fiber materials have tensile strengths far greater than polyurethane, examples of which are shown in the following table of typical values:

| Fiber | Tensile Strength, psi |
|---|---|
| Nylon | 145,000 |
| Fiberglass | 500,000 |
| Kevlar | 400,000 |
| Steel | 285,000 |
| Boron Filament | 500,000 |
| Graphite Filament | 350,000 |

The other aspect of the composite is the strength of the bond between the fiber and the matrix. If the fibers are coated with a material to promote bonding ("glue"), the strength of the bond will take the form $$F=\pi D_f L\sqrt{(2K\Gamma/t)} \qquad [4]$$

where t is the thickness of the film, K is the bulk modulus of the film, and Γ is the surface energy of the film.

This force should be large compared to the forces deforming the fibers and acting to rupture the bond, giving $$L^3\sqrt{(2K\Gamma/t)}/(E_f D_f^3)<1 \qquad [5]$$

This places criteria on the optimum aspect ratio $$(L/D_f)^3>E_f/\sqrt{(2K\Gamma/t)} \qquad [6]$$

to prevent failure of the adhesive bond between fiber and matrix. Thus, using equation 3, we find the aspect ratio of the fiber is bounded by $$\sqrt{(E_f/T_f)}<(L/D_f) \qquad [7]$$

and the new bound $$[E_f/\sqrt{(2K\Gamma/t)}]^{1/3}<(L/D_f) \qquad [8]$$

Thus, both criteria give lower bounds. Criterion [7] appears to be more stringent. Criterion [8] gives a number on the order of $1<L/D_f$.

If the bond between the fiber and the matrix is due only to surface tension forces (physical and not chemical bond), and not a "glue" bond, then the force takes the form $$F=\pi D_f\Gamma' \qquad [9]$$

where Γ' is now the Dupre work of adhesion of the fiber-matrix contact. The bounds on the aspect ratio of the fiber to accomplish the purpose of preventing progation of cracks in the matrix become $$[E_f L/\Gamma']^{1/3}<(L/D_f) \qquad [10]$$

Note $E_f L/\Gamma'$ depends on L. However, this gives 10–20$<L/D_f$, similar to [7]. (using $\Gamma'=50-100$ dyn/cm, and $L=0.1$ cm)).

If a chemical bond is promoted between the fibers and the matrix, then a result similar to equation [9] will obtain, giving $$[E_f L/\gamma]^{1/3}<(L/D_f) \qquad [11]$$

where Y now indicates the energy per unit are of the chemical bond.

The contact are of the blade and imaging member is a high stress area typically 20 microns in width. A function of the fibers is to distribute this high stress, which can cause tearing and abrading, into the lower stress areas within the bulk of the blade. This indicates that fiber lengths of 100 to 1000 microns are preferable, but the maximum fiber length is limited by the requirement of being small compared with the lateral dimension of the cleaning blade (i.e., the thickness of the blade).

In recapitulation, it is evident that the cleaning blade of the present invention includes fibers spaced no more than 10 times a toner particle diameter apart from each other (or the critical dimension referred to earlier) within the bulk material of the cleaning blade. The fibers are short with a high aspect ratio preferably at least 10:1. The orientation of these fibers is random. The tight spacing of the filler fibers within the bulk material prevents defect propagation from occurring in the blade and thus, increases the blade life.

It is, therefore, evident that there has been provided in accordance with the present invention, a blade of a composite material for removing particles from the photoconductive surface. The blade of the present invention fully satisfies the objects, aims and advantages hereinbefore set forth. While this invention has been described in conjunction with a specific embodiment thereof, it is evident that many alternatives, modifications and variations will be apparent to those skilled in the art. Accordingly, it is intended to embrace all such alternatives, modifications and variations as fall within the spirit and broad scope of the appended claims.

It is claimed:

1. A cleaning blade in frictional engagement with a surface and being adapted to remove particles therefrom, comprising:

a blade body having one end thereof defining a free edge, said blade body including a multiplicity of randomly oriented fibers, having a high aspect ratio, therein; and means for supporting said blade body so as to press the free edge thereof against the surface such that the aspect ratio of the fibers is greater than the square root of the fibers' Young's modulus divided by the fibers tensile strength.

2. A cleaning blade in frictional engagement with a surface and being adapted to remove particles therefrom, comprising:

a blade body having one end thereof defining a free edge, said blade body including a multiplicity of randomly oriented fibers therein where the fibers range from about 100 μm to about 1000 μm in length; and means for supporting said blade body so as to press the free edge thereof against the surface.

3. A cleaning blade in frictional engagement with a surface and being adapted to remove particles therefrom, comprising:

a blade body, having an elastomeric material matrix, with one end thereof defining a free edge, said blade body including a multiplicity of randomly oriented fibers therein, said fibers tending to bond with said elastomeric material matrix of said blade body with said elastomeric material and Young's modulus of said elastomeric material of said blade body being increased by less than 5% as a result of the fibers and said elastomeric material of said blade body being chosen from the group consisting of polyester, polyether and urethanes; and means for supporting said blade body so as to press the free edge thereof against the surface.

4. A cleaning blade in frictional engagement with a surface and being adapted to remove particles therefrom, comprising:

a blade body, of elastomeric material, having one end thereof defining a free edge, said blade body including a multiplicity of randomly oriented fibers therein;

a critical dimension equal to ten times the toner particle diameter or the carrier bead particle diameter; and means for supporting said blade body so as to press the free edge thereof against the surface.

5. A cleaning blade as recited in claim 4, wherein said desired number of fibers per unit volume of the elastomeric material of said blade body is equal to one over a cube of said critical dimension which is about equal to the carrier bead particle diameter.

6. A cleaning blade in frictional engagement with a surface and being adapted to remove particles therefrom, comprising:

a blade body, of elastomeric material, having one end thereof defining a free edge, said blade body including a multiplicity of randomly oriented fibers homogeneously dispersed throughout the elastomeric blade body material, wherein a desired number of the fibers per unit volume of the elastomeric material of said blade body is equal to one over the cube of a critical dimension, wherein the critical dimension is equal to about ten times the toner particle diameter; and means for supporting said blade body so as to press the free edge thereof against the surface.

7. A cleaning blade as recited in claim 6, wherein said desired number of fibers per unit volume of the elastomeric material of said blade body is equal to one over the cube of the critical dimension, which is about equal to the carrier bead diameter.

8. A cleaning blade as recited in claim 7, wherein said desired number of the fibers per unit volume of the elastomeric material of said blade body is the cube of about ten times said toner diameter or the cube of said carrier bead diameter, whichever is smaller.

9. A cleaning blade in frictional engagement with a surface and being adapted to remove particles therefrom, comprising:

a blade body having one end thereof defining a free edge, said blade body including a multiplicity of randomly oriented fibers therein, wherein the fibers of said cleaning blade are spaced a distance from one another such that propagation of blade defects is retarded and proximity of the fibers to each other is a distance of less than about ten times that of the toner particle diameter; and means for supporting said blade body so as to press the free edge thereof against the surface.

10. A cleaning blade as recited in claim 9, wherein the proximity of the fibers to each other is a distance of less than the carrier bead particle diameter.

11. A cleaning blade as recited in claim 10, wherein said distance is about equal to ten times said toner diameter or said distance is about equal to carrier bead particle diameter, whichever is smaller.

* * * * *